(12) United States Patent
Zhou et al.

(10) Patent No.: US 6,554,882 B1
(45) Date of Patent: Apr. 29, 2003

(54) RAPID TOOLING SINTERING METHOD AND COMPOSITIONS THEREFOR

(75) Inventors: Gongyao Zhou, Cherry Hill, NJ (US); Zongyan He, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 09/084,720

(22) Filed: May 26, 1998

(51) Int. Cl.[7] ............... B22F 3/10; B22F 3/22
(52) U.S. Cl. ............... 75/228; 419/5; 264/610
(58) Field of Search ............... 264/610; 419/5; 75/228

(56) References Cited

U.S. PATENT DOCUMENTS 5,641,920 A * 6/1997 Hens et al. ............... 75/228
5,989,476 A * 11/1999 Lockard et al. ............... 264/401
6,224,816 B1 * 5/2001 Hull et al. ............... 264/401

* cited by examiner

*Primary Examiner*—Daniel J. Jenkins
(74) *Attorney, Agent, or Firm*—Akin Gump Strauss Hauer & Feld, L.L.P.

(57) ABSTRACT

A rapid tooling method is provided for molding metal particles, ceramic particles or mixtures thereof directly from patterns comprising a meltable, soluble or decomposable substance and preferably formed by rapid prototyping technology, as well as particle compositions therefor. The method comprises mixing at least about 95% by weight sinterable metal particles, sinterable ceramic particles or mixtures thereof with at least about 0.5 wt. % to about 5.0 wt. % binder to form a powder mixture; casting the mixture around a pattern; applying pressure sufficient to compact the mixture to form a preform; removing the pattern; and heating the preform at a sintering temperature sufficient to sinter the particles and form a molded article. The pattern may be removed by either melting, dissolving or decomposing, and the sintering process preferably includes two stages which are performed simultaneously with the infiltration of metal, whereby which both shrinkage and distortion of molded article can be reduced or eliminated.

14 Claims, 2 Drawing Sheets

RAPID TOOLING SINTERING METHOD AND COMPOSITIONS THEREFOR

BACKGROUND OF THE INVENTION

The present invention is directed to a new rapid tooling (RT) sintering method based on rapid prototyping (RP) technology and powder compositions therefor. Rapid tooling (RT) technologies are based on established techniques related to rapid prototyping (RP).

The formation of metal parts, especially those that are intricately or irregularly shaped such as mold cavities for the injection molding of thermoplastics, gears, sprockets, or threaded parts, may involve many process steps. Often, the formation process involves the steps of casting, machining, heat treatment for hardening, tempering, polishing and plating of the parts. Significant volume changes during casting usually require time consuming and expensive processing. Before the creation of rapid prototyping techniques, a skilled technician might take many weeks or months to machine a regular prototype model. The resulting prototype was likely to have dimensional inaccuracies due to human error.

The term "prototype" defines a positive model of an article and has essentially the same dimensions of compression or injection molded articles. The prototype is usually more porous than the molded article, but otherwise it is visually essentially indistinguishable from the molded article, and functions in essentially the same manner as the molded article. A prototype is used for complete evaluation of the form, design, and performance of a desired molded article.

Using a variety of technologies, it is now possible to generate prototype models in a few days or weeks. These models are termed "rapid prototyped models" (RP models) and are usually based on CAD-Solid Modeling technology, which is well known in the art. "CAD" is an abbreviation for Computer Aided Design in which the design is displayed three-dimensionally on a cathode ray tube. CAD-Solid Modeling is the method by which these three-dimensional computer models may be transformed into three dimensional solid positive models, i.e., RP models.

An example of CAD-Solid Modeling is the process of stereolithography which is well known in the art and disclosed, for example, in U.S. Pat. No. 4,575,330, issued Mar. 11, 1986 to Hull, which is hereby incorporated by reference. Generally, a photopolymerizable liquid resin is subjected to selective bombardment of radiation to form a step-wise laminar buildup of the desired object. The rapid prototype comprises a resin, which has limited strength and heat durability, but has dimensions which accurately represent the computerized data from which it was created.

With the advantages of speed and accuracy, rapid prototyping technologies advanced quickly after their introduction in the early 1980's, and a large market has been created for rapid prototyping equipment and services. The arrival of more sophisticated solid modeling systems based on computer generated models is expected to increase the design complexity of part geometry.

The next logical step forward after the creation of rapid prototyped models is to create "rapid tooling" (RT) which would be used to create production versions of the rapid prototype models. RT is a process of quickly and efficiently manufacturing a negative mold ("tool") from a positive RP model. By "negative" it is meant that the mold will impart its form to fluid, powder or other substance and the fluid, powder or other substance adopts the dimensional form of the prototype. A "positive" mold will impart its form to a fluid, powder or other substance, but a "negative" reproduction of the prototype will be formed.

When the fluid, powder or other substance is stabilized or solidified, the RP can be removed leaving a tool. The tool has the negative dimensional characteristics of the prototype and can be used to form molded articles in mass production. An example of this process is injection molding. This process involves molding metal, plastic, or non-plastic ceramic shapes by injecting a measured quantity of the molten or non-polymerized material into the tool.

Ideally, rapid tools can be created in a short time and at a low cost. However, due to the limitations of strength and heat durability of RP photopolymerized resins which are made by stereolithography, most of the negative molds (tools) cannot be applied to real productivity due to warping, shrinking and melting of the resin RP when the negative mold is made. Thus, the formation of intricately or irregularly shaped parts, such as mold cavities for the injection molding of thermoplastics, gears, sprockets, or threaded parts, may involve many processing steps which are time consuming and expensive. Often, the formation process involves the steps of casting, machining, heat treatment for hardening, tempering, polishing and plating of the parts. Significant volume changes during casting may require expensive and careful processing. Machining and polishing can be particularly difficult for intricate or irregular shapes. The formation of parts from very hard, corrosion resistant alloys greatly increases the difficulty in processing.

A number of techniques have been developed to create rapid tools from rapid prototypes. The two technologies which are most popular are the Selective Laser Sintering (SLS) process and the Keltool process. The SLS process, as disclosed in U.S. Pat. No. 5,342,919, issued Aug. 30, 1994 to Dickens, Jr. et al., describes a laser-sinterable powder product which is prepared, deposited and leveled into a thin layer. Following a pattern obtained from a two dimensional section of a 3-D CAD model, a $CO_2$ laser sinters the thin layer of the target region and generates a first slice of sintered powder in a two-dimensional shape. Subsequent layers are applied and sintered until the part is complete. The part or prototype is nearly fully dense and may be further refined by drying, firing and copper infiltration.

Thus, a rapid tool capable of running a large number of injection molded parts can be created. The turnaround time for creating production quality parts can be as little as two weeks with this process. However, the cost of this operation is reported to be very high and the accuracy of the product is still poor due to the dimensional gaps surrounding the periphery of each layer. Preparing different types of molds, such as ceramic or ceramic metal parts is also difficult. Further, because the infiltration and sintering are separate processes, some distortion and shrinkage will occur.

The Keltool process was developed more than 20 years ago. During this process a Room Temperature Vulcanizing (RTV) mold is created from a master part by pouring silicone rubber around a thermoplastic pattern, which may be based on a resin CAD-stereolithography technology. After the silicone rubber is solidified, the master part is removed from the silicone rubber by cutting the silicone rubber along a parting line. This step is difficult and time consuming. Another difficultly is the removal of the RTV mold from the green compact. Typically, the mold is heated in a furnace to burn out the silicone rubber, which causes pollution. The formed RTV mold is then filled with a metal powder/binder mixture to form a green compact which is sintered and further treated.

Another method of producing dense metal molds and parts from rapid prototyped models is disclosed in U.S. Pat. No. 5,507,336 issued Apr. 16, 1996 to Tobin. In this patent, which involves numerous steps, a resin RP pattern is placed in a steel tube and a ceramic slurry and a binder is cast around the critical surfaces thereof. The RP pattern is burned out, preferably by heating in a furnace at 1100° F. for three hours, and metal powder is cast around the critical surfaces of the ceramic member. An infiltration metal is placed over the powder and the apparatus is placed in a furnace at 2100° F. for at least one hour. The ceramic member is then removed and what is formed is a metal part or a mold half suitable for mating with another mold half to form a mold for casting multiple parts.

This procedure suffers from numerous draw backs. First, the final sintered metal part or mold is two degrees removed from the RP pattern. The RP pattern is transferred to the ceramic member, which is in turn transferred from the ceramic member to the metal particles. This increases the possibility of errors in the final metal product. The additional steps increase the time and expense of the process. Further, during the infiltration process the steel tube thermally expands at a greater rate than the ceramic member. This causes a gap between the inner surface of the steel tube and the ceramic, and infiltration metal leaks through. These problems increase cost and delay production by requiring hand machining of the final mold.

The molding of parts from metal or ceramic powder may be also be accomplished by the "powder-injection molding" process. Thereby, a binder/powder wet paste is formulated in which the binder serves as a lubricant. The mixture is forced into the mold under pressure and the binder subsequently removed by heating to form a porous green preform. The preform is heated to its sintering temperature and an infiltration metal is added thereafter.

While this process is an improvement over the first generation "press and sinter metallurgy" process, the resulting parts shrink considerably when heated to remove the binder from the preform, and there are limitations on the size of parts that can be fabricated by this process. Thus, these powders are not applicable to the reproducing the intricate patterns that may be formed by RP technology. Examples of powder-injection molding processes and powders include the following publications:

U.S. Pat. No. 4,906,424, issued to Hughes et al. on Mar. 6, 1990, discloses a method for injection molding ceramic or metallic powders by use of a binder. The ceramic powder may have a multi modal particle size distribution such that smaller diameter particles are provided to fill the interstices between larger particles. The primary binder material is a polymerized monomer or mixture of monomers that may be polymerized thermally, radiatively, or catalytically. The polymerized monomers may include various polyols. Suitable dispersants or surfactants such as oleic acid and stearic acid may be included in the binder as processing aids.

The mixture of binder and ceramic or metallic material may be injection molded. The mold temperature is maintained at about 50° C. to about 200° C. to initiate polymerization. The binder may be burned off by heating the preform to a temperature below about 700° C. Finally, the molded article is sintered at a temperature ranging from approximately 700° C. to 2200° C. to obtain the final product.

The aforementioned prior art process has two significant drawbacks. First, forming intricate or irregularly shaped parts is often difficult because the powder compositions have inadequate flow properties that lead to density variations within the parts. In addition, the aforementioned process often produces shrinkage and distortion of parts during heating phases, since binders are essentially totally removed without modifying the connecting structure between the powder particles.

U.S. Pat. No. 5,328,657, issued Jul. 12, 1994 to Kamel et al. discloses a method of molding metal particles by producing a flowable mixture in which the binder chemically reacts with the metal particles. The flowable mixture is transferred to a mold before the chemical reaction between the metal particles and the polyorganic acid proceeds as far as to substantially increase the viscosity of the flowable mixture. The proportion of the metal powder to the binder is about 40 to about 60 volume percent. As stated in the patent, even when the green preform has a porosity greater that 50% before sintering, there is only about a 2 to 3% density reduction. However, forming a green preform that is almost fully dense for ensuring against density variations and providing greater detail is preferable.

Thus, a satisfactory method for using rapid prototyping still does not exist. Accordingly, there is still a need for a method to advantageously incorporate the rapid prototype (RP) technology into a rapid tooling method satisfactorily in terms of cost and turn around time.

SUMMARY OF THE INVENTION

According to the present invention, the above and other deficiencies of the prior art are alleviated or eliminated by a method for molding metal particles, ceramic particles or mixtures thereof and compositions therefor. According to the present invention, a method of molding particles to form molded articles, comprises the steps of:

a. mixing at least about 95% by weight sinterable metal particles, sinterable ceramic particles or mixtures thereof with at least about 0.5 wt. % to about 5.0 wt. % binder to form a powder mixture;

b. casting the mixture around a pattern wherein the pattern comprises a meltable, soluble or decomposable substance;

c. applying pressure sufficient to compact the mixture to form a preform;

d. removing the pattern by melting, dissolving or decomposing;

e. heating the preform at a sintering temperature sufficient to sinter the particles and form a molded article.

According to a preferred method, the pattern comprises a polymer which is formed by the method of RP technology and step (d) comprises removing the pattern by either heating the preform to a melting temperature sufficient to cause the pattern to melt and flow into a recycling container or subjecting the preform to a solvent to dissolve the pattern. Preferably, the melting temperature is in the range of from about 110° C. to about 115° C., or in the range from about 130° C. to about 135° C. such that water wave figures are formed on the surface of the mold for forming a decorative design.

According to other preferred embodiments, the preform is first heated to a drying temperature to thoroughly dry the particles, then either heated to the melting temperature to remove the pattern or treated with at least one solvent to dissolve the pattern, for example when the pattern comprises a polymer, and then the preform is removed from the dryer for cooling. Thereafter, the preform is heated to a vaporizing temperature to vaporize the binder in a furnace, then heated in stages to higher sintering and/or infiltration temperatures in the presence of a protective gas to sinter and infiltrate the metal particles with an infiltration metal.

According to the another preferred embodiment, the sintering and infiltration of green compacts are carried out simultaneously under a properly controlled temperature, whereby which both shrinkage and distortion of molded article can be reduced or eliminated.

According to a second aspect of the present invention, the above and other deficiencies of the prior art are alleviated or eliminated by providing a composition for molding metal particles, ceramic particles or mixtures thereof in which the metal and/or ceramic particles are combined with a small amount of binder. Preferably, the metal and/or ceramic powders are present in an amount of about 95% by weight to about 99.5% by weight and the binder is present in an amount of about 0.5 wt. % to about 5 wt. % to form a powder mixture.

Accordingly, the present invention provides for a method of preparing sintered articles without the aforementioned problems. Further, by using the method of the present invention, metal, ceramic or ceramic-metal parts and molds can be manufactured from RP models and the polymeric material used for preparing the pattern can be easily recycled.

BRIEF DESCRIPTION OF THE DRAWINGS

The foregoing summary, with the following detailed description of the invention, will be better understood when read in conjunction with the appended drawings. For the purpose of illustrating the invention, there are shown in the drawings embodiments which are presently preferred, it being understood, however, that the invention is not limited to the specific arrangements and instrumentalities disclosed.

In the drawings.

DETAILED DESCRIPTION OF THE INVENTION

By the present invention a new method of molding particles to form molded articles, in particular a method for rapid tool manufacturing, is shown. The method comprises the step of mixing at least about 95% by weight sinterable metal particles, sinterable ceramic particles or mixtures thereof with at least about 0.5 wt. % to about 5 wt. % binder to form a powder mixture, which will be described in more detail hereinafter. By methods well known in the art, the sinterable powder composition is cast around a meltable, soluble or decomposable pattern, most preferably a thermoplastic polymeric RP pattern made of a crystalline polymer which has a specific melting point. "Meltable" and/or "decomposable" are also intended to include such characteristics as sublimable or vaporizable. A suitable RP pattern can be made, for example, using an RP machine available from Sanders Prototype Inc. of Merrimac, N.H., which also supplies suitable polymeric build and support materials for producing the pattern.

The preferred casting pressure is from about $2 \times 10^6$ to about $3 \times 10^{10}$ Pa for a period from 0.01 to 0.5 hours to produce a green preform. By "green preform" or "preform," it is meant to refer to the pressed metal and/or ceramic particles which have not yet been sintered. One of ordinary skill in the art will understand that the pressure level and duration may vary based upon factors known in the art, such as the types and quantities of material and processing equipment employed. Pressures which are too high may damage the pattern. Pressures which are too low will not sufficiently compact the green preform. The pressure may be applied by any conventional pressurizing device or method, such as die compaction (DC). For example, the powder composition may be die compacted by use of a conventional metallographic mounting press. An example of such a press is the "Pneumatic Press" (Catalog No. 10-1360-115), which is commercially available from Buchler, Ltd. of Evanston, Ill.

Prior to casting, it is preferred that the interface and surface of the pattern be sprayed with a release agent, such as silicone, to prevent the molten polymer of the pattern from entering the green preform. An example of a release agent is Silicone Release Agent which is a product of Stoner Inc.

Figure 1:
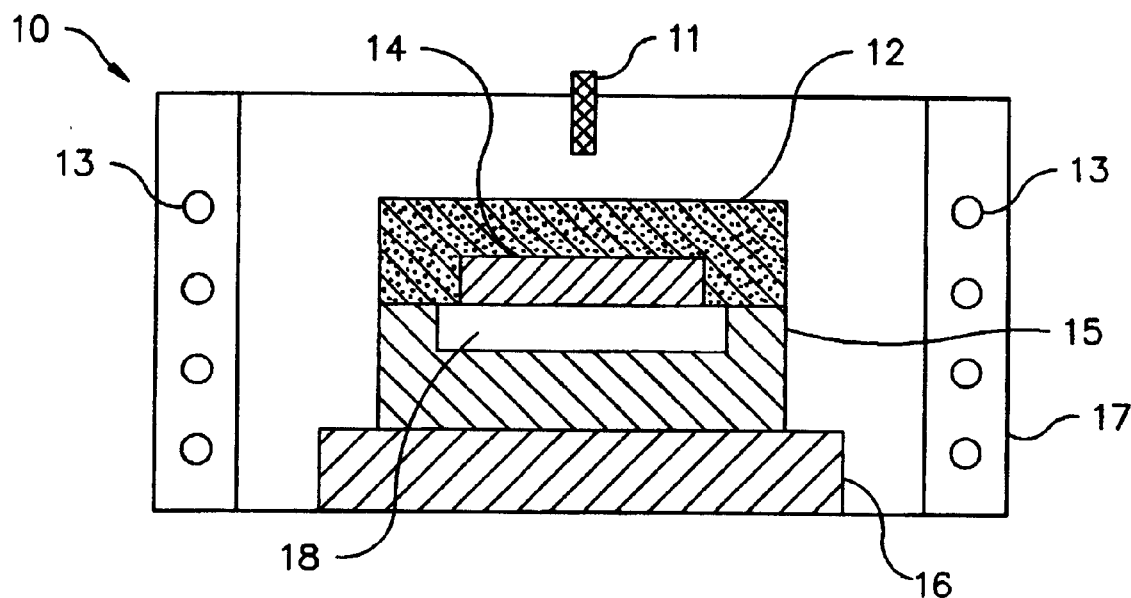
FIG. 1 depicts removal of a pattern in a dryer.

Referring now to the drawings and more specifically to FIG. 1, a dryer 10 is shown having a thermocouple 11 and dryer wall 17 which is equipped with heating coils 13. The green preform 12 which has been cast around pattern 14 is oriented such that the meltable or soluble pattern 14 will melt or dissolve and drain away from the green preform 12 under the influence of gravity.

Beneath the green preform 12 cast around pattern 14 is recycling container 15 having a recess 18 therein sufficient to collect and contain the melted or dissolved pattern 14. It is understood by those of ordinary skill in the art that recycling container 15 may be any size or shape and having any added drainage features which would assist in the collection of the melted or dissolved pattern 14. It is also within the scope of the present invention that recycling container 15 may have any added or special support features attached thereto or situated between the recycling container 15 and the green preform 12. For example, recycling container 15 may have struts or support prongs. Recess 18 may be of a small size having a larger recycling container connected thereto by a drainage means. Preferably, the recycling container 15 is removable and is supported underneath by a support 16. However, it is within the scope of the present invention to eliminate support 16 or integrally connect support 16 with recycling container 15.

Preferably, support 16, which is positioned under recycling container 15, green preform 12 and pattern 14 are placed into the dryer 10 as a unit, and the drying temperature is adjusted to from about 50° C. to about 65° C. for about 24 hours. The purpose of the drying step is to remove the solvent from the binder composition to "set" the green preform. During the drying step, some reactions may occur between the binder ingredients. For example, if epoxy resin is used as a binder, the cross linking of linear molecules can occur under the action of hardeners, so the molecular weight can be increased greatly. The degree of cross linking depends mainly on the hardener and surrounding temperature. For example, polyamine or other amines can be used as a hardener. In this case, the hydroxyl groups produced from opening up the epoxy resin radicals can continuously react with other epoxy resin radicals to form a net structure, and the green preform will have a certain strength due to the solidification of binder materials.

Thereafter, the dryer temperature is raised to a melting temperature for a period of time which is sufficient to melt the entire pattern. The temperature and duration of the melting time will vary from pattern to pattern, depending on the melting point of the pattern and the volume thereof. Obviously, patterns which have a large internal volume and small surface area will require longer times to melt and flow or dissolve away. Conversely, patterns having a low internal volume and high surface area will require less melting time. For this invention, a preferred melting temperature is about 110° C. to about 115° C.

If desired, the melting temperature for the polymer material, which has a melting point of about 110° C., can be raised to a temperature about 15° C. to about 50° C., more preferably about 25° C., above its melting temperature. A preferred temperature is about 130° C. to about 135° C. When the melting temperature is in this range over the actual polymer melting temperature, on the interface of the mold and the pattern, some water wave figures can be formed, which can be used as a special decorative design. FIG. 5a shows the water wave design in the background of a dragon logo.

While melting or dissolving of pattern 14 is preferred, those of ordinary skill in the art will understand that other methods of removing the pattern are known. For example, it is well known to burn or volatilize the pattern. However, melting the pattern is most preferred from a recycling standpoint.

Another method of removing the pattern 14 is by immersing the green preform 12 in at least one solvent for a period of time in order to dissolve the polymer pattern. The solvent should be one which cannot dissolve the solidified binder. A preferred solvent is hot water which has a suitable temperature range from 70° C. to 90° C. A temperature which is too high may cause deformation or distortion of the green preform, whereas a temperature which is too low will reduce the dissolving rate greatly. Using the polymer provided by Sanders Prototype Inc., when the temperature of the water is 90° C., a polymer pattern (50 mm×30 mm×10 mm) can be dissolved completely in 3 minutes. Some special organic solvents, such as methylbenzene or $HCON(CH_3)_2$, can also be used. If methylbenzene is used to dissolve the same pattern, the needed time is about 1.5 hour.

Figure 2:
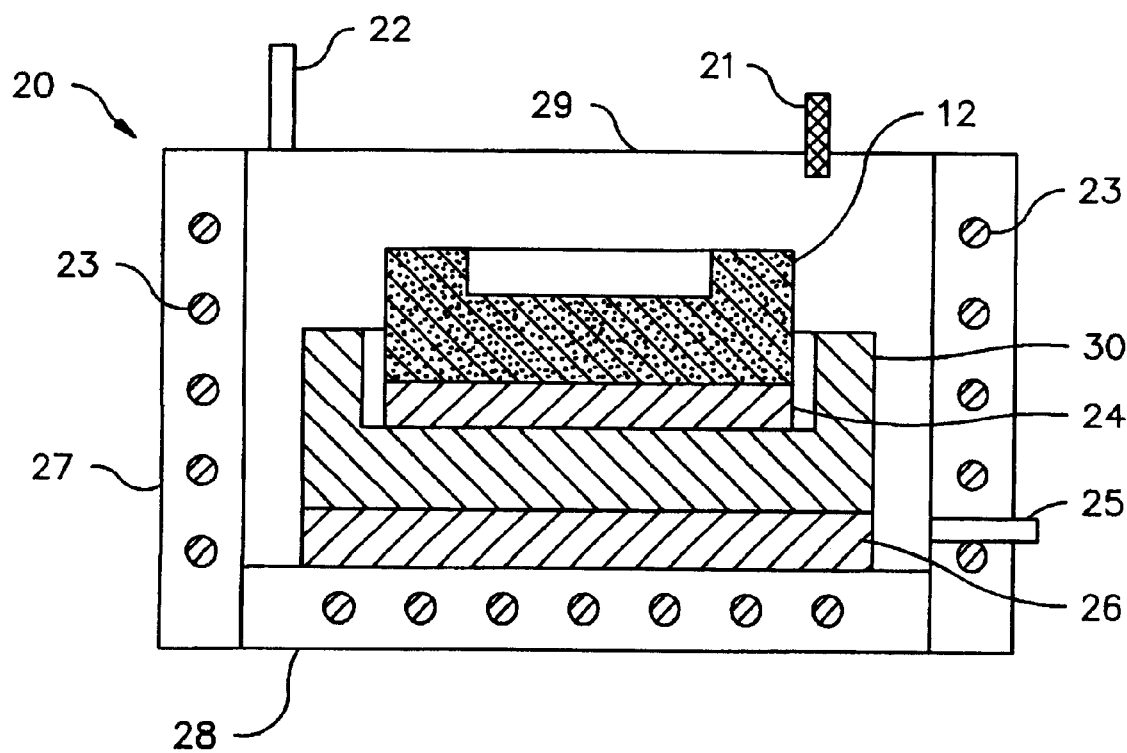
FIG. 2 depicts sintering and infiltration of a green preform in a furnace.

Subsequent to drying and removal of the pattern 14, the container 15 and support 16 are removed from dryer 10, cooled preferably to room temperature and placed in furnace 20. With reference to FIG. 2, preferably, the green preform 12 is inverted so that the non-critical surface thereof is supported by an infiltration metal 24, which is in turn supported by an infiltration metal container 30 which may be formed of graphite. The size of the container 30 depends on the mold's size and the volume of infiltration metal 24. The infiltration metal container 30 may comprise any additional features similar to those described for recycling container 15, such as support prongs which will more advantageously position the green preform 12 with respect to the infiltration metal 24. The container 30 may be supported by a second support 26 for ease in placing and removing the assembly of the green preform 12, infiltration metal 24 and container 30 into and out of the furnace 20.

The furnace 20 may be any furnace capable of reaching temperatures sufficient to sinter metal and/or ceramic particles. Another important feature of furnace 20 is gas intake valve 25 by which a protective gas such as nitrogen, hydrogen, ammonia and/or argon may be provided. Furnace 20 preferably also comprises thermocouple 21, exhaust pipe 22, heating coil 23 and furnace walls 27, 28, and 29.

Figure 3:
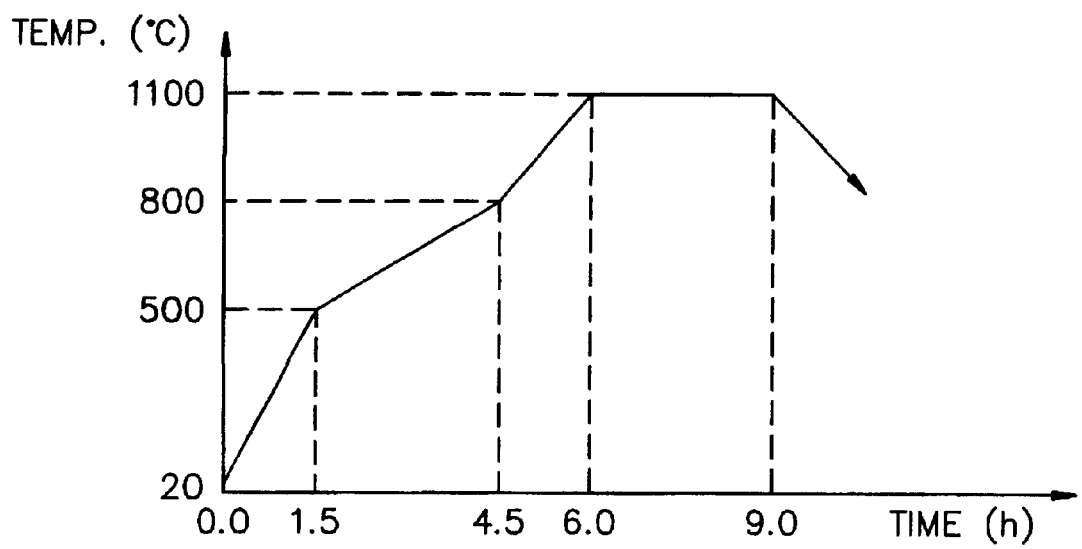
FIG. 3 is a graph of a preferred temperature program for sintering and infiltration of a green preform which is primarily metal.

FIG. 3 is a graph of a preferred temperature program for sintering and infiltration of the green preform 12 when the sinterable particles are primarily metal particles and most preferably comprise at least 90% metal particles by weight. Preferably, during a vaporization stage, the temperature of furnace 20 is raised linearly from room temperature to about 400° C. to about 600° C., preferably about 500° C., in a time span of about 0.45 to about 2.0 hours, preferably about 1.5 hours. During this vaporization stage, substantially all of the unreacted binder is vaporized from the green preform 12 by heat-induced combustion.

Thereafter the preferred temperature program comprises at least two sintering stages having a first sintering temperature and a second sintering temperature. As used herein, the term "sintering" refers to the formation of a coherently bonded mass of metal and/or ceramic powder by heating at a temperature below the melting point of the metal and/or ceramic. That is, during sintering the inter-particle contacts form necks but the metal and/or ceramic does not flow or propagate. It is believed that at least a portion of the carbon fiber chains of the binder remain covalently bended to the metal surface after sintering.

The sintering is carried out in an inert or non-oxidizing atmosphere such as argon gas. If oxygen is present in the atmosphere during heating to the first temperature or sintering, a portion of the carbon bonding the metal particles together may be released from the structure to join with the oxygen to form carbon monoxide or carbon dioxide. Especially, a portion of metal particles will be oxidized by the oxygen. Therefore, the absence of oxygen is preferred.

When using metal powder to make injection molds, the binder should have a higher thermal decomposition temperature (from 350° C. to 600° C.). A program for sintering the green preform is designed as shown in FIG. 3, for example. A first (vaporization) step comprises gradually increasing the temperature of furnace 20 from room temperature or above to a temperature of about 350° C. to about 600° C., preferably about 500° C. In this step some binder degradation will occur. In order to reduce deformation and the distortion of green preform caused by softening of the binder due to its degradation at high temperature, this stage should be as short as possible.

The next step (first sintering stage) is from the vaporization temperature of the binder or above to a temperature of about 700° C. to about 900° C., preferably about 800° C. In this stage the volatilization of the binder residue will occur. It should be reasonably longer than the first (vaporization) step. As shown in FIG. 3 this stage will continue for a duration of about 2 to about 4 hours, preferably about 3 hours. Another purpose of this stage is to form a half-melted metal and/or ceramic powder slurry. Those of ordinary skill in the art will realize that different temperatures and time periods are within the scope of the invention.

A next (second) sintering stage occurs when the temperature is raised from the last (first) sintering temperature to a higher sintering temperature, preferably from about 1000° C. to about 1200° C., most preferably about 1100° C. The temperature is gradually raised from the lower temperature to the higher as shown in FIG. 3 for a time period of about 1 to about 2 hours, preferably about 1.5 hours. However, longer or shorter time periods are within the scope of the invention.

After this stage, the temperature of furnace 20 is held at about 1000° C. to about 1200° C., most preferably about 1100° C., for about 3 hours as shown in FIG. 3 to infiltrate the infiltration metal 24 in order to increase the strength of the molded primarily metal article. Longer or shorter time periods, such as 2 hours to 4 hours, are contemplated. Those of ordinary skill in the art understand that infiltration times and temperatures are dependent upon the capillary effect of the molded or sintered article. The capillary effect is dependent on the porosity of the sintered article which is in turn dependent upon the quantity of binder to metal and/or ceramic and particle size distribution. According to the present invention, at most about 5% of binder is used which decreases porosity. When a two-tiered particle size distribution is used, porosity is further decreased. This would increase the time required for infiltration.

Figure 4:
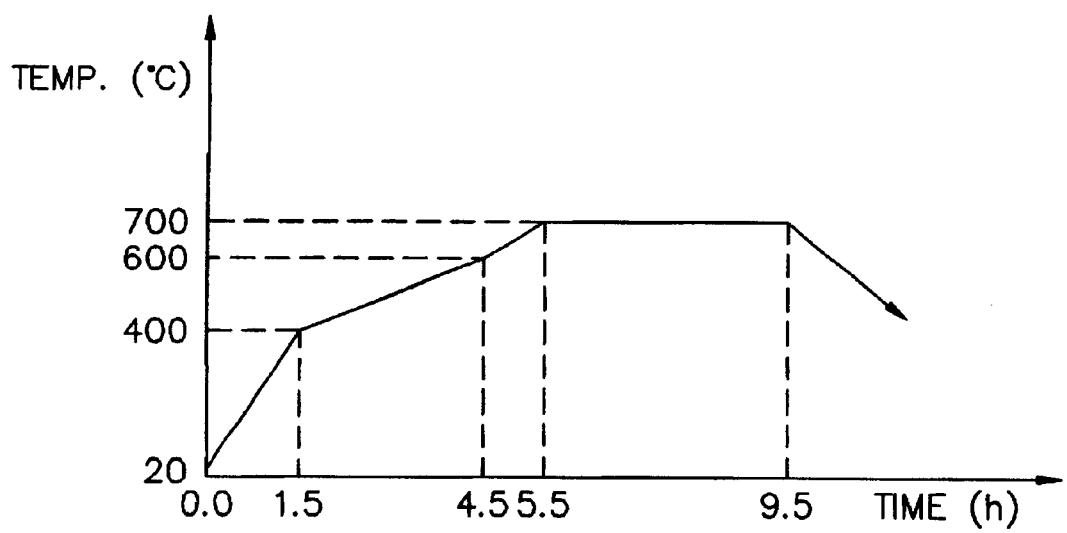
FIG. 4 is a graph of a preferred temperature program for sintering and infiltration of a green preform which is primarily ceramic.

When the particles comprise at least about 50% of ceramic particles, and more preferably at least about 70% of ceramic particles, the preferred temperature program for binder vaporization and sintering is changed. As shown in FIG. 4, for example, a first ceramic binder vaporization stage comprises raising the furnace temperature from room temperature to between about 300° C. to about 500° C., preferably to about 400° C., in a linear fashion for a time period of about 1 to about 2 hours, most preferably about 1.5 hours. A binder vaporization occurs in this stage.

The temperature is then gradually raised to about 500° C. to about 675° C., most preferably about 600° C. during a time period of about 2 to about 4 hours, most preferably about 3 hours. Those of ordinary skill in the art will realize that different temperatures and time periods are within the scope of the invention. The temperature in this stage is substantially lower than most prior art ceramic sintering temperatures because the main purpose of this stage is to remove the binder completely and not to sinter the ceramic particles.

A next (sintering) stage occurs at a temperature of between about 675° C. and about 900° C., preferably at about 700° C. The temperature is gradually raised from the lower temperature to the higher, preferably 700° C. as shown in FIG. 4, during a time period of about 0.25 to about 1 hour, preferably about 0.5 hours. However, longer or smaller time periods are within the scope of the invention.

After this stage, the temperature of furnace 20 is held at the final temperature, which is preferably about 700° C., for about 3 to about 6 hours, preferably about 4.5 hours as shown in FIG. 4, to complete the sintering and infiltrate the infiltration metal 24 in order to increase the strength of the molded article. The infiltration metal used is preferably a type of aluminum—magnesium alloy, in which the weight proportion of magnesium is from about 2% to about 30%, preferably from 15% to 20%. Also, a special protective gas, e.g., nitrogen, should be provided. Under the above mentioned temperature of about 700° C. and when nitrogen is used as a protective gas, a portion of the molten aluminum—magnesium alloy will react with the nitrogen in the porous green preform according to the following equations:

$Al + N = AlN$

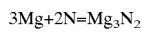

$3Mg + 2N = Mg_3N_2$

Due to very loose micro-structures, the products of the reactions, i.e., AlN and $Mg_3N_2$, cannot protect the lower layer of molten aluminum—magnesium alloy. Thus, the lower layer of molten aluminum—magnesium alloy will continuously react with nitrogen, so the molten aluminum—magnesium alloy will penetrate the resultant layer, and the same reactions will occur again and again with the nitrogen until all the cavities in the preform are filled by the molten alloy and the products of the reactions. After the molten alloy solidifies, the formed composite part made of ceramic particles, aluminum—magnesium alloy, AlN and $Mg_3N_2$ will have a higher strength and hardness than that of aluminum—magnesium alloys.

Another function of the magnesium in the alloy is to prevent aluminum oxide ($Al_2O_3$) film from forming on the surface of molten aluminum. Even in a protective gas, such as nitrogen, hydrogen or argon, $Al_2O_3$ film having a thickness of about $2 \times 10^{-5}$ cm will form. Even at this small thickness, due to the very compact micro-structure, the wettability of molten aluminum on ceramic particles will be reduced greatly, so that the molten metal cannot penetrate the porous green preform even under pressure. However, if metals are added which are more active than aluminum, such as magnesium or calcium, the $Al_2O_3$ film on the surface of the molten aluminum can be damaged and the lower layer molten metal will react with the contacting gases.

Although magnesium can damage (penetrate) $Al_2O_3$ film and increase the wettability of molten aluminum alloy on ceramic particles, an oxidizing atmosphere must be avoided or the metal particles, binder and magnesium will be oxidized very quickly at high temperature. Hydrogen, argon or other inert gases cannot react with aluminum and magnesium so that the molten alloy cannot enter the porous preform. Therefore, as a protective gas, nitrogen is the best choice.

It is also an important aspect of the present invention that the sintering of the metal and/or ceramic particles and the infiltration thereof be conducted concurrently or simultaneously. Typically, the metal and/or ceramic particles will have a melting temperature greater than that of the infiltration metal. Therefore, during the sintering process, the infiltration step takes place. Thus, the infiltration metal fills and solidifies in the voids between the metal and/or ceramic particles during the sintering and prevents the typical sintering shrinkage and distortion exhibited by prior art processes.

According to the present method, very complicated patterns can be accurately transferred to a tool without the need for subsequent processing, polishing or plating of parts. The aforedescribed method is unique in its ability to produce molds in a short time, such as a week, with fewer processing steps, without producing inferior molds. On the contrary, the molded articles according to the present invention are superior to prior art molds. They are superior in accuracy, detail and hardness.

In order to most preferably produce molded articles according to the aforedescribed method, the present invention is also directed to a unique powder composition which may comprise metal particles, ceramic particles or mixtures thereof. Another important feature of the present invention is the ability to fabricate metal, ceramic and ceramic-metal parts. Most prior art methods are limited to application to only specific materials and cannot reproduce patterns directly from RP models.

The preferred metal particles useful in the methods and compositions of the present invention may be selected from transition metals and alloys thereof. By the term "transition metal", the present invention includes elements 21 through 29 (scandium through copper), 39 through 47 (yttrium through silver), 57 through 79 (lanthanum through gold), and all known elements from 89 (actinium) on. All are metals. However, the preferred metal particles are iron, cobalt, tungsten, copper, beryllium or alloys thereof such as tungsten carbide, steel, stainless steel, beryllium copper and nickel. Most preferably, the metal particles are iron or an iron alloy, such as carbon steel. One of ordinary skill in the art, however, would understand that any type of sinterable metal particles may be useful in the present invention.

Ceramic-metal composites are within the scope of this invention. By the term ceramic-metal composites, it is understood by those of ordinary skill in the art that any ratio of ceramic to metal particles may be used in the present invention. For example, the ceramic particles may comprise only a portion of the overall particle composition, such as about 10% by weight, the remainder being metal particles. Increasing or decreasing the ceramic portion in about 5% by weight increments will change the final property of the sintered article. Increasing the ratio of ceramic particles will raise the hardness, resistance to wear, heat resistance and corrosing resistance of the composite. Powder compositions comprising any range of ceramic to metal particles such as about 15%, 20%, 25%, . . . , 75%, 80%, 85%, 90% and 95% or more by weight ceramic particles, the remainder being metal particles, form useful sintered articles according to the present invention. A preferred ceramic metal composition comprises about 70% by weight sinterable ceramic particles and about 30% by weight sinterable metal particles.

The ceramic powders useful in the methods and compositions of the present invention include oxide ceramic powder and non-oxide ceramic powder, such as aluminum oxide ($Al_2O_3$), silicon dioxide ($SiO_2$), zirconia ($ZrO_2$) and silicon carbide (SiC).

Particle sizes may range from about 0.1 $\mu$m to 75 $\mu$m or 100 $\mu$m or even larger, depending on the desired intricacy of the mold and other factors. In order to obtain a high surface finish and uniform microstructure of the product, the maximum size of the particle should not exceed a given value, such as 100 $\mu$m, preferably 75 $\mu$m. On the other hand, it is preferable that the particles do not have much uniformity in size, or a too narrow distribution of size. A wider size distribution of the particle will be helpful to the stacking of the particles, thus a higher density of the green preform can be expected. It will be understood by those of ordinary skill in the art that other particle sizes including varying sizes may be used. For example, the particles may comprise first and second groups of particles, the first group having an average particle size or average particle diameter greater than the average particle size of the second group, i.e., a bimodal particle size distribution. Alternatively, a plurality of groups of differently sized metal particles may be used to form a multimodal mixture of selected particle sizes or the metal particles may be of a uniform average particle size. The smaller sized particles are used to fill void space between the larger sized particles. The smaller sized particles may be of the same or a different metal than the larger sized particles. Preferably, the smaller sized particles may be, for example, carbonyl iron fine powder.

It will also be understood that particle size, particle size distribution, and particle shape of the metal powder can affect the process in several ways. Finer particles usually result in a smoother surface finish, but also require longer infiltration times. Particle size distribution affects the lap density of the metal powder, which in turn affects the metal powder to infiltration-metal ratio in the final mold. Such problems are known in the art and described, for example, in U.S. Pat. No. 5,507,336, which is incorporated herein by reference. A two tier particle size distribution technique is disclosed in U.S. Pat. No. 5,342,919, which is incorporated herein by reference.

Preferred metal particles are in the form of an alloy steel powder, such as the product S-7 tool steel powder having a maximum particle size of less than 63 $\mu$m (through 325 mesh) and a chemical composition of about 0.7 to about 0.8% by weight carbon, about 0.35% by weight silicon, about 0.4 to about 0.6% by weight magnesium, less than about 0.03% by weight sulfur and less than about 0.035% by weight phosphorous, the remainder being iron. A preferred ceramic metal composite comprises about 70% by weight $\alpha$-$Al_2O_3$ powder having a maximum particle size of less than 63 $\mu$m (through 325 mesh) and about 30% by weight SS-101 powder having a maximum particle size of less than 63 $\mu$m (through 325 mesh).

The ratio of the binder to the sinterable particles is of significant importance. According to the present invention, it is unexpectedly found that by using a very small percentage of binder in ratio to the sinterable particles, a method for forming sintered articles is provided which produces highly detailed molds having complex geometry quickly, accurately and much less expensively than prior art methods. Only a small percentage, about 0.5 wt. % to about 5 wt. %, preferably from about 1 wt. % to about 3 wt. %, and most preferably about 2 wt. % of binder, is used, the remainder being sinterable particles.

A preferred composition comprises about 70 weight % of about 50 to 55% by weight of a phenol formaldehyde resin, about 25% by weight petroleum distillates, about 15 to 20% by weight dibasic ester, about 7% by weight phenol; and 30 weight % of a polymeric MDI type diisocyanate.

The invention will now be illustrated in further detail with reference to the following specific, non-limiting examples:

Example 1

A solid model of a plastic part to be made by using injection molding was designed in a CAD computer system. The model was converted into an STL file receivable by the 3-D printing machine. A polymer pattern was made on a substrate by the machine according to the provided STL file. The pattern was removed from the substrate and located on a base plate of a disassemblable metal frame. E408 Dry Film Mold Release (a product of Stoner Inc.) was spread on the interfaces of the frame. The surface of the pattern was sprayed with Silicone Release Agent (a product of Stoner Inc.) to prevent the molten polymer material of the pattern from entering the green mold when it was heated for removing the pattern.

A mixture of metal powder and binder was cast into the frame around the located pattern under pressure. The powder used was S-7 tool steel powder, its size was less than 0.063 mm (through 325 mesh); its chemical composition was C: 0.7 to 0.8; Si: 0.35; Mn: 0.4–0.6; S<0.03; P<0.035, the remainder being Fe. The binder was compounded with two polymer materials provided by the Ashland Chemical Company. The first, Novathane I, was present in an amount of 70% by wt. Its components include a phenol formaldehyde resin (50–55% by wt.), aromatic petroleum distillates (25% by wt.), a dibasic ester (15–20% by wt.) and phenol (7% by wt.). The second, Novathane II, was present in an amount of 30% by wt, which is a polymeric MDI type diisocyanate (100% by wt.). The total ratio of the binder in the mixture was 2% by wt. The casting pressure was provided by a small hydraulic press in the range of $2 \times 10^6$–$3 \times 10^9$ (Pa) for 0.25 hours.

The frame was put into a dryer for 24 hours; the temperature of the dryer was kept at 50–65° C. The temperature of the dryer was raised to 110–115° C. for 5–10 minutes. The pattern melted and flowed into a recycling container. The frame was then separated from the green mold, and the green mold was removed from the dryer for cooling. A graphite container containing pure copper plate and the green mold were put into a furnace. The copper plate was beneath the green mold. The protective gas was nitrogen. The temperature program of FIG. 3 was followed, and the temperature was increased linearly from room temperature to 500° C. in a period of 1.5 hours. The temperature was then increased linearly from 500° C. to 800° C. during a time period of 3.0 hours. The temperature was then increased linearly from 800° C. to 1100° C. during a time period of 1.5 hours. The temperature was held at 1100° C. for 3.0 hours. The furnace was cooled, and the molded article removed.

The molded article (mold) was examined carefully and was found to have no shrinkage or pattern gaps. The mold had a tensile strength of 517 MPa, an elongation of 0.01%, a hardness of HRC 30–50, a surface finish of less than 3 µm in Ra, and an accuracy of 1–2 µm/mm. The total linear shrinkage of the mold during the whole process was 1.8–2.5%.

Example 2

The steps of Example 1 were repeated except that the powder was composed of 70 wt % $\alpha$-$Al_2O_3$ powder, particle diameter was less than 0.063 mm (through 325 mesh), and 30 wt % SS-101 powder (through 325 mesh). The ratio of binder was 2.5% by wt. The green mold was placed in the furnace and infiltrated with Mg—Al alloy under protection of nitrogen gas. The Mg—Al alloy was prefabricated in a vacuum furnace by mixing magnesium (25% by wt.) and aluminum pieces. In accordance with the temperature program of FIG. 4, the temperature was increased linearly from room temperature to 400° C. in a period of 1.5 hours. The temperature was then increased linearly from 400° C. to 600° C. during a time period of 3.0 hours. The temperature was then increased linearly from 600° C. to 700° C. during a time period of 0.5 hours. The temperature was maintained at 700° C. for 4.5 hours. The furnace was cooled, and the molded article removed. The mold had a tensile strength of 345 MPa, an elongation of 0.008%, a hardness of HRC 40–70, a surface finish of less than 4 µm in Ra, and an accuracy of 1–2 µm/mm. The total linear shrinkage of the mold during the whole process was 1.8–2.2%.

The present invention surpasses prior art molding methods by permitting the formation of intricate or irregularly shaped parts from powder compositions faster and more economically. The novel method and powder composition essentially eliminate the shrinkage, distortion, and density variations typically produced upon sintering of prior art compositions. The method also is able to quickly and accurately reproduce the critical surfaces of prototypes formed by CAD-rapid prototypes.

Those skilled in the art will appreciate that changes can be made to the embodiments described above without departing from the broad inventive concept thereof. It is understood, therefore, that this invention is not limited to the particular embodiments disclosed, but is intended to cover modifications which are within the spirit and scope of the invention as defined by the appended claims.

We claim:

1. A method of molding particles to form a molded article, comprising the steps of:
    a. mixing at least about 95% by weight sinterable metal particles, sinterable ceramic particles or mixtures thereof with at least about 0.5 wt. % to about 5.0 wt. % binder to form a powder mixture;
    b. casting the mixture around a pattern wherein the pattern comprises a meltable, soluble or decomposable substance;
    c. applying pressure sufficient to compact the mixture to form a preform;
    d. removing the pattern by melting, dissolving or decomposing; and
    e. heating the preform at a sintering temperature sufficient to sinter the particles and form the molded article under an atmosphere of protective gas.

2. The method according to claim 1, wherein the pattern comprises a polymer formed by rapid prototyping technology and step (d) comprises removing the pattern by either heating the preform to a melting temperature sufficient to cause the pattern to melt and flow into a recycle container or dissolving the preform in at least one solvent.

3. The method according to claim 2, wherein the melting temperature is in a range from about 110° C. to about 115° C.

4. The method according to claim 2, wherein the melting temperature is in a range from about 130° C. to about 135° C. such that water wave figures are formed on the surface of the mold for forming a decorative design.

5. The method according to claim 2, wherein said at least one solvent comprises water having a temperature range from about 10° C. to about 115° C.

6. The method according to claim 1, wherein the pressure in step (c) is from about $2 \times 10^6$ to about $3 \times 10^{10}$ Pa.

7. The method according to claim 1, wherein the temperature is gradually increased to a sintering temperature of at least about 700° C.

8. The method according to claim 1, wherein the particles are primarily metal particles and the sintering is performed in at least two stages, a first stage having a temperature gradually increasing from a binder vaporization temperature to a first sintering temperature of about 700° C. to about 900° C. during a time span of about 2 to about 4 hours, and a second stage having a temperature gradually increasing from the first sintering temperature to a second sintering temperature of about 1000° C. to about 1200° C. during a time span of about 1 to about 2 hours.

9. The method according to claim 1, wherein step (e) comprises simultaneously applying an infiltration metal for increasing the strength of the molded article.

10. The method according to claim 9, wherein the infiltration metal is selected from the group consisting of copper, beryllium, aluminum, magnesium, and other metals or alloys thereof with a lower melting point than the sintering particle materials.

11. The method according to claim 1, wherein the particles comprise at least about 70% by weight sinterable ceramic particles and the infiltration metal is an aluminum-magnesium alloy comprising about 2% to about 30% by weight Mg and the protective gas is nitrogen.

12. The method according to claim 11, wherein the sintering is performed in at least three stages, a first stage having a temperature gradually increasing to a binder vaporization temperature of about 300° C. to about 500° C. during a time span of about 1 to about 2 hours, a second stage having a temperature gradually increasing from the binder vaporization temperature to a sintering and further binder removal temperature of about 500° C. to about 675° C. during a time span of about 2 to about 4 hours, and a third stage having a temperature gradually increasing to a metal infiltration temperature of about 675° C. to about 900° C.

13. The method according to claim 1, further comprising treating the molded article by surface polishing, sanding, machining or grinding.

14. A process of forming a three-dimensional product comprising using the molded article prepared according to claim 1 as a mold.

* * * * *